M. ROTHKUGEL.
CHART FOR THE TEACHING OF DANCING.
APPLICATION FILED JAN. 30, 1918.
1,277,645.
Patented Sept. 3, 1918.
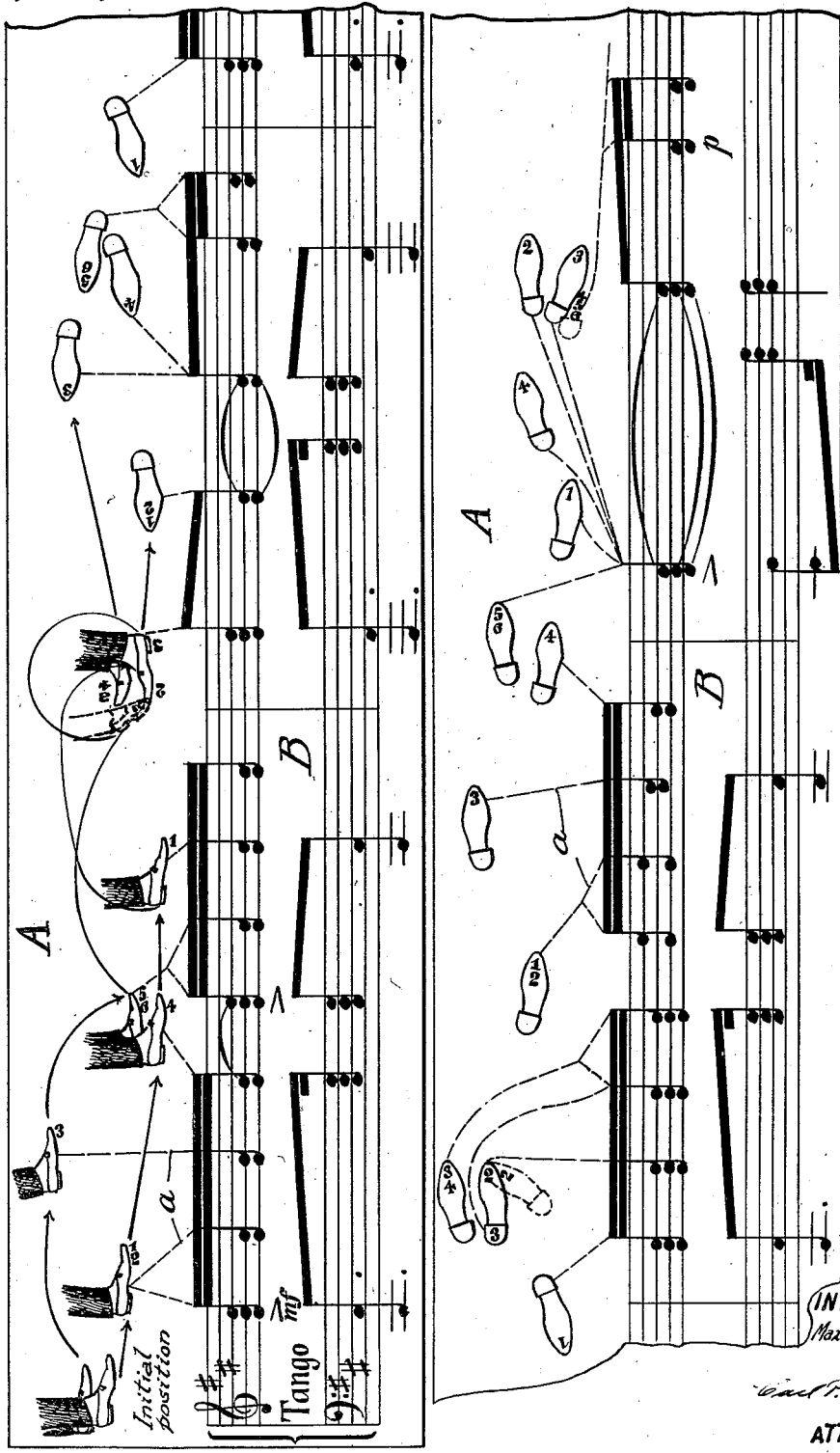
INVENTOR
Max Rothkugel
BY
ATTORNEY

UNITED STATES PATENT OFFICE.

MAX ROTHKUGEL, OF NEW YORK, N. Y.

CHART FOR THE TEACHING OF DANCING.

1,277,645.

Specification of Letters Patent.

Patented Sept. 3, 1918.

Application filed January 30, 1918. Serial No. 214,439.

*To all whom it may concern:*

Be it known that I, MAX ROTHKUGEL, a citizen of the United States, and resident of the borough of Manhattan, city, county, and State of New York, have invented certain new and useful Improvements in Charts for the Teaching of Dancing, of which the following is a specification.

My invention relates to an improved chart for the convenient and efficient teaching of various dances. The steps of the particular dance to be taught are represented graphically in chart form, either on a reduced scale as to give the chart a handy size, which also permits of binding a number of charts together in book form, or the chart may be produced on a "natural" scale, either directly on the floor, or on a separate, interchangeable surface adapted to be placed on the floor, the representation of the steps being either in the form of foot prints, or in any other suitable manner. According to one feature of my present invention, the foot prints or corresponding marks are provided with consecutive symbols (generally numerals) indicating the sequence of the steps, and all placed so that their bottom or base will be toward the heel end of the corresponding mark, and therefore in such a position as to be easily read by the person using the chart, as said person will naturally look at the successive marks in a direction toward the toe ends of the marks. Another feature of this invention relates to combining with the graphic representation of the dance steps, on the same chart, a graphic representation of corresponding music, in proper relation thereto. Other features of my invention will appear from the detailed description given hereinafter and from the appended claims.

In the accompanying drawings, I have shown, as an illustrative example of my invention, part of a chart for teaching the tango.

The improved chart, as stated above, may be produced either directly on the dancing floor or, preferably, on a strip of paper or other suitable material to be laid on the floor, and tacked or otherwise secured in place, if desired. The chart shown in the drawing comprises two sections, A, B, which would generally be produced on the same piece of paper or other material, so that their relation would be permanent; but if preferred, the section A containing the music might be on a separate piece from the section B containing the foot prints or corresponding marks, thereby enabling the section B to be used alone, or with different music, as desired. The music on section A is represented in the usual way, and the marks (foot prints, etc.) on section B are numbered consecutively in accordance with the sequence of steps, this latter feature, broadly considered, having been proposed prior to my invention; but it will be noted that all of the numerals or symbols shown in connection with the marks indicating the steps, face in the same direction relatively to the heel or toe end of such mark, that is to say, in each case the bottom or base of the numeral or other symbol (obviously consecutive letters might be used instead of numerals) will be toward the heel end of the corresponding mark, so that it will be readily visible to the pupil. If any of the symbols were placed otherwise, it would be very inconvenient for the pupil to read them, as the figures would appear to him sidewise, or upside down, if they do not face toward the heel end of the mark as described and shown. When special movements occur, such as pivoting on the toe (see the second 2 mark) the mark may be modified, as by showing the toe end only, and by an arrow showing the direction of pivoting, to better indicate such movement to the pupil.

It will be understood that each of the numbers or symbols corresponds to one count or beat of the music tempo, that is, the symbols indicate not only the order or succession of the steps, but also the rhythm, that is, the relative length of time for the different steps. Most of the modern dances have hesitation steps, which means that the foot has to be kept in the same position for more that one beat or count, sometimes even a measure, and in such cases, there would be two or more symbols on the same mark, according to the length of time this particular position is to be retained. Thus in the drawing, several of the marks have two symbols, indicating that these particular positions are kept for two beats or counts, as will also be seen by reference to the corresponding music.

The marks are preferably given the form shown in the drawing for the first few steps, where each mark consists of the representation of a foot and the lower part of the leg.

This illustrative mark also makes it easy to indicate rising or dropping on toes or on heels as shown. In some cases, the simpler showing of marks (foot prints) appearing in the other part of the drawing may be adopted. When using marks of this character, dropping the heel may be indicated by placing the symbol on the heel, and not at the toe, and raising the toe may be indicated by omitting the representation of the toe and putting the symbol where such representation would be. Of course, other ways of illustrating or indicating various movements might be chosen.

The foot prints or equivalent marks are placed as near as possible to the notes of the music corresponding in time to the particular steps indicated by such marks. In many cases it is not possible to secure absolute correspondence or registry in the position of the notes and of the respective marks, for instance when one note corresponds to two successive steps; and to meet such cases, as well as for the purpose of greater clearness in all cases, it is preferable to connect the several foot prints or other marks with the corresponding notes by lead lines such as indicated at *a*.

It will be understood that chart may be made on such a scale that the pupil will actually put his or her feet successively on the several marks of the chart, these marks thus indicating the proper position of the feet, the length of steps to be taken, as well as swinging or turning movements, while the symbols (say numerals) indicate the proper succession of the steps and the lead lines *a* enable the pupil to more readily keep his movements in time with the music. But I do not wish to restrict myself to making the chart on this particular scale, and of course a number of charts showing different dances might be bound together in book form, especially if the scale is smaller than the "natural" scale. Such books would generally contain, in addition to the dancing charts, pages of explanatory matter relating to the charts and to dancing in general.

Sheet music may be published with the dancing steps illustrated or indicated thereon in accordance with my invention.

The marks used for left foot and right foot respectively, are preferably somewhat different, as shown, and may be further differentiated, if desired, say by producing them in different colors.

It will be understood that the chart may bear various explanations or instructions to facilitate its use, such as the words "Initial Position" appearing on the drawing, and others.

To facilitate the reading of the chart by beginners, the successive marks belonging to the same foot, may be connected by lines or arrows, as shown in the drawing, at the left-hand upper corner, and this feature (which, however, is not essential) would be suitable particularly for intricate figures.

It will be understood that if desired, the chart may show the steps of two dancing partners in their proper relative position and succession.

I have illustrated a preferred and satisfactory embodiment of my invention, but it is obvious that changes may be made therein within the spirit and scope thereof, as defined in the appended claims.

I claim:

1. A dancing chart provided with marks indicating successive steps, and having consecutive designating symbols all of which have their bottom or base toward the heel end of the respective mark.

2. A dancing chart provided with marks indicating successive positions of the feet and with a graphic representation of music adjacent to said marks.

3. A dancing chart provided with marks indicating successive positions of the feet, with a graphic representation of music adjacent to said marks, and lead lines extending from the said marks to the corresponding notes of the music.

4. A dancing chart composed of two sections, one of which is provided with a longitudinal series of marks indicating successive positions of the feet, and the other with a graphic representation of music ranging lengthwise of said second section, the marks of the first-named section being approximately adjacent to the corresponding notes of the other section.

5. A dancing chart provided with marks indicating successive steps, and having consecutive designating symbols, sundry of said marks having a plurality of symbols for each mark to indicate the number of beats during which the position represented by the particular mark is to be held.

6. A dancing chart provided with marks indicating successive steps, and having consecutive designating symbols, said symbols occupying different positions relatively to the respective marks to indicate special movements.

In testimony that I claim the foregoing as my invention, I have signed my name in presence of two subscribing witnesses.

MAX ROTHKUGEL.

Witnesses:
D. LEWIS MATTERN,
M. M. WEINBERG.